United States Patent
Kim

(10) Patent No.: US 10,570,546 B2
(45) Date of Patent: Feb. 25, 2020

(54) CONTROL METHOD OF WASHING MACHINE

(71) Applicant: LG ELECTRONICS INC., Seoul (KR)

(72) Inventor: Kyounglan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 221 days.

(21) Appl. No.: 15/608,196

(22) Filed: May 30, 2017

(65) Prior Publication Data

US 2017/0342627 A1 Nov. 30, 2017

(30) Foreign Application Priority Data

May 30, 2016 (KR) .................. 10-2016-0066792

(51) Int. Cl.
*D06F 33/02* (2006.01)
*D06F 39/00* (2006.01)
*D06F 39/04* (2006.01)
*D06F 39/08* (2006.01)
*G05B 19/04* (2006.01)

(52) U.S. Cl.
CPC .......... *D06F 33/02* (2013.01); *D06F 39/003* (2013.01); *D06F 39/045* (2013.01); *D06F 39/087* (2013.01); *D06F 39/088* (2013.01); *G05B 19/0415* (2013.01)

(58) Field of Classification Search
None
See application file for complete search history.

(56) References Cited

U.S. PATENT DOCUMENTS

| 2006/0010613 | A1* | 1/2006 | Jeon | D06F 35/006 8/158 |
| 2006/0016020 | A1 | 1/2006 | Park | |
| 2006/0101588 | A1* | 5/2006 | Park | D06F 25/00 8/158 |
| 2011/0047716 | A1* | 3/2011 | Cho | D06F 37/306 8/137 |
| 2014/0123403 | A1* | 5/2014 | Zattin | D06F 25/00 8/137 |

(Continued)

FOREIGN PATENT DOCUMENTS

| EP | 2 183 422 | 5/2010 | |
| EP | 2746442 A1 * | 6/2014 | ............ D06F 33/02 |
| KR | 10-1994-0007264 | 4/1994 | |

OTHER PUBLICATIONS

European Search Report dated Aug. 10, 2017 issued in Application No. 17173365.2.

*Primary Examiner* — Cristi J Tate-Sims
(74) *Attorney, Agent, or Firm* — KED & Associates, LLP

(57) ABSTRACT

In a control method of a washing machine, a washing operation is performed through a heating washing process for a first set time and is performed through a non-heating washing process for a residual time, and, if the heating washing process is started, the rotation of a driving motor is weakly controlled until a washing water temperature reaches a primary target temperature, and is strongly controlled until the washing water temperature reaches a secondary target temperature after the washing water temperature reaches the primary target temperature, so that the washing water temperature is relatively gradually increased.

11 Claims, 7 Drawing Sheets

(56) References Cited

U.S. PATENT DOCUMENTS

2014/0208522 A1* 7/2014 Oh ..................... D06F 35/005
                                                    8/137
2015/0067970 A1* 3/2015 Kim ..................... D06F 33/02
                                                    8/137

* cited by examiner

CONTROL METHOD OF WASHING MACHINE

CROSS-REFERENCE TO RELATED APPLICATION

The present application claims the benefits of priority to Korean Patent Application No. 10-2016-0066792 filed on May 30, 2016, which is herein incorporated by reference in its entirety.

BACKGROUND

The present disclosure relates to a control method of a washing machine.

A washing machine may be defined as a laundry treating apparatus that removes pollutants stained on laundry including clothes through washing, rinsing, and dehydration processes.

In addition, a washing cycle may include a water supply operation, a laundry wetting operation, a heating operation, and a washing operation. In the heating operation, a heater mounted in a tub is operated to increase the temperature of washing water, so that pollutants stained on laundry are effectively removed.

In general, the washing operation may include heating washing performed in a state in which washing water is heated to a set temperature, and non-heating washing performed in a state in which washing water is at a normal temperature. In order to perform the heating washing, a washing heater mounted in the tub is operated to heat washing water to the set temperature, and the drum is then rotated.

In order to heat the washing water to the set temperature as fast as possible, the washing is most preferably maintained in a state in which it is still without shaking. However, when the drum is maintained in a stop state so as to minimize shaking of the washing water in the process of heating the washing water, the washing operation may be started in a state in which a washing agent is not completely dissolved in the washing water. As a result, the undissolved washing agent is stuck to laundry in a lump state. Therefore, the washing agent may be still attached to the laundry even after rinsing and dehydration cycles are ended. As a result, the washing agent is not completely dissolved in the washing water in the washing process, and therefore, the washing effect of the washing machine is deteriorated.

In addition, when the drum is not rotated in the process of heating the washing water, a detergent action in which the washing agent is stuck to pollutants stained on the laundry is not promoted. Therefore, the laundry may not be completely washed, or a washing time may be increased.

Meanwhile, if the drum is rotated in one direction in the process of heating the washing water, the above-described problem may be improved to a certain degree, but the time required to heat the washing water to the set temperature may be delayed due to shaking of the washing water. Moreover, when the drum is rotated in a certain rotation mode, it is highly likely that the time required to heat the washing water to the set temperature will be delayed.

In addition, if the temperature of the washing water is increased to 60 degrees Celsius or higher, protein pollutants may be coagulated as the washing water is in immediate contact with the protein pollutants.

SUMMARY

Embodiments provide a control method of a washing machine, in which a washing operation is performed through a heating washing process for a first set time and is performed through a non-heating washing process for a residual time, and, if the heating washing process is started, the rotation of a driving motor is weakly controlled until a washing water temperature reaches a primary target temperature, and is strongly controlled until the washing water temperature reaches a secondary target temperature after the washing water temperature reaches the primary target temperature, so that the washing water temperature is relatively gradually increased.

In one embodiment, there is provided a control method of a washing machine including: selecting a washing course and a washing option, and sensing an amount of laundry; supplying washing water and a washing agent, corresponding to the sensed amount of laundry; performing a laundry wetting operation for a set time; and performing a washing operation after the laundry wetting operation is completed, the control method including: if the washing operation is started, operating a washing heater; operating a drum in a first motion until a washing water temperature reaches a first set temperature (T1); and if the washing water temperature reaches the first set temperature (T1), operating the drum in a second motion, wherein a number of rotations of the drum in the second motion is greater than that of rotations of the drum in the first motion.

In another embodiment, there is provided a control method of a washing machine including: selecting a washing course and a washing option, and sensing an amount of laundry; supplying washing water and a washing agent, corresponding to the sensed amount of laundry; performing a laundry wetting operation for a set time; and performing a washing operation after the laundry wetting operation is completed, the control method including: if the washing operation is started, operating a washing heater; operating a drum in a first motion until a washing water temperature reaches a first set temperature (T1); and if the washing water temperature reaches the first set temperature (T1), operating the drum in a second motion, wherein the first motion is a motion in which the drum is rotated less than once in each of clockwise and counterclockwise directions, wherein the second motion is a motion in which the drum is rotated once or more in one direction.

The control method according to the present disclosure configured as described above has advantageous effects as follows.

First, various enzymes capable of effectively removing washing pollutants are contained in a washing detergent, some enzymes have high vitality at about 40 degrees Celsius and may be denaturalized at a temperature equal to or higher than 40 degrees Celsius. Thus, the driving motor is controlled at a low speed such that washing water is rapidly heated up to 40 degrees Celsius. Accordingly, the washing enzymes can be vitalized as fast as possible.

Second, after the washing water temperature reaches 40 degrees Celsius, the rotation speed of the driving motor is increased such that the washing water temperature is relatively gradually increased up to a target temperature, and simultaneously, the rotation of the driving motor is varied, so that it is possible to minimize a phenomenon that protein pollutants are coagulated. As a result, pollutants stained on laundry can be effectively removed.

Third, the motion of the driving motor is variably controlled such that the increase ratio of the washing water temperature with respect to time is differently formed based on the first set temperature, so that it is possible to optimize temperature control and improve washing performance.

Fourth, the washing operation is performed as the drum is rotated in a specific motion even in the process of heating washing water, thereby improving washing performance.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Hereinafter, a control method of a washing machine according to an embodiment of the present disclosure will be described in detail with reference to the accompanying drawings.

Figure 1:
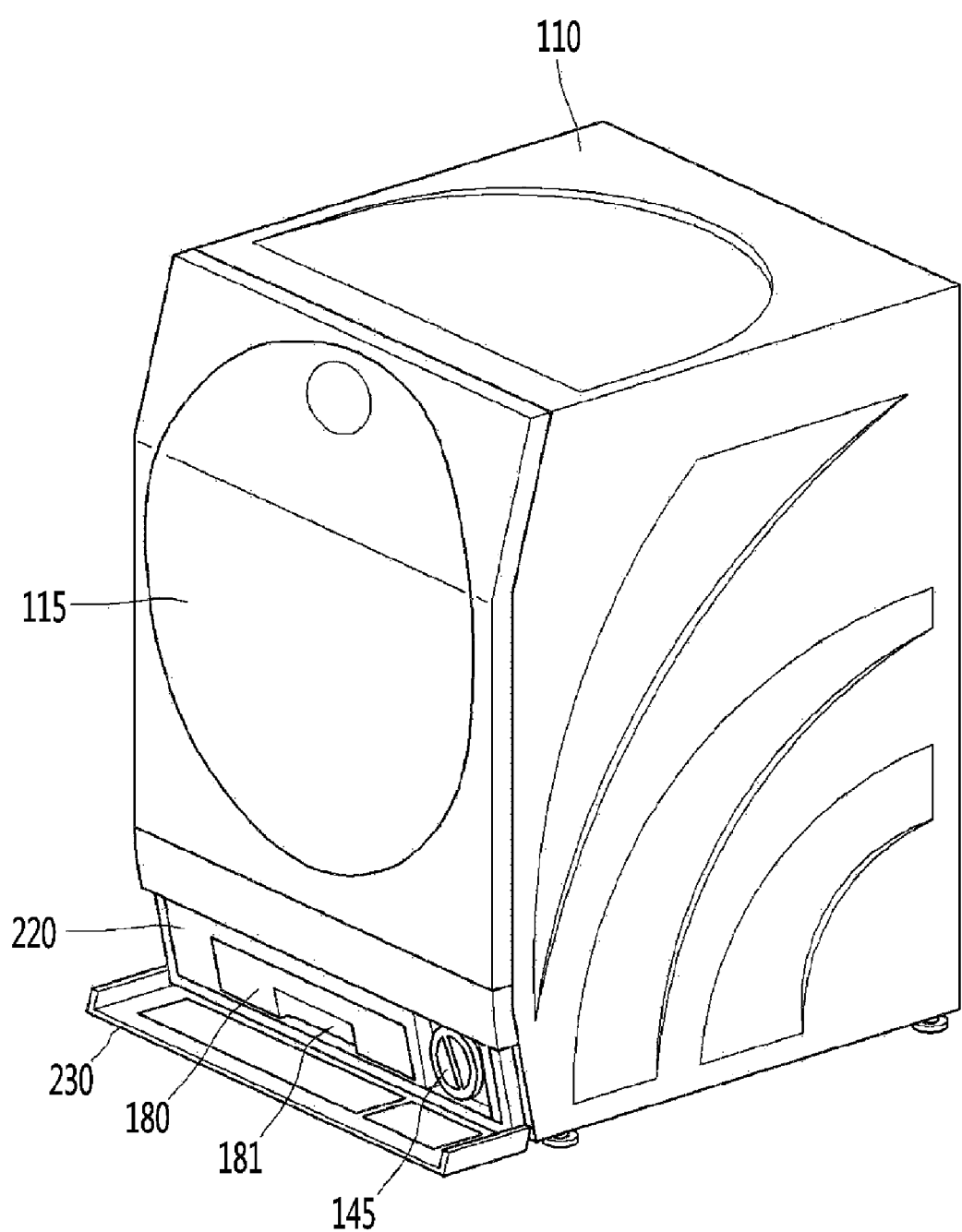
FIG. 1 is a perspective view illustrating an appearance of a washing machine to which a control method according to an embodiment of the present disclosure is applied.
Figure 2:
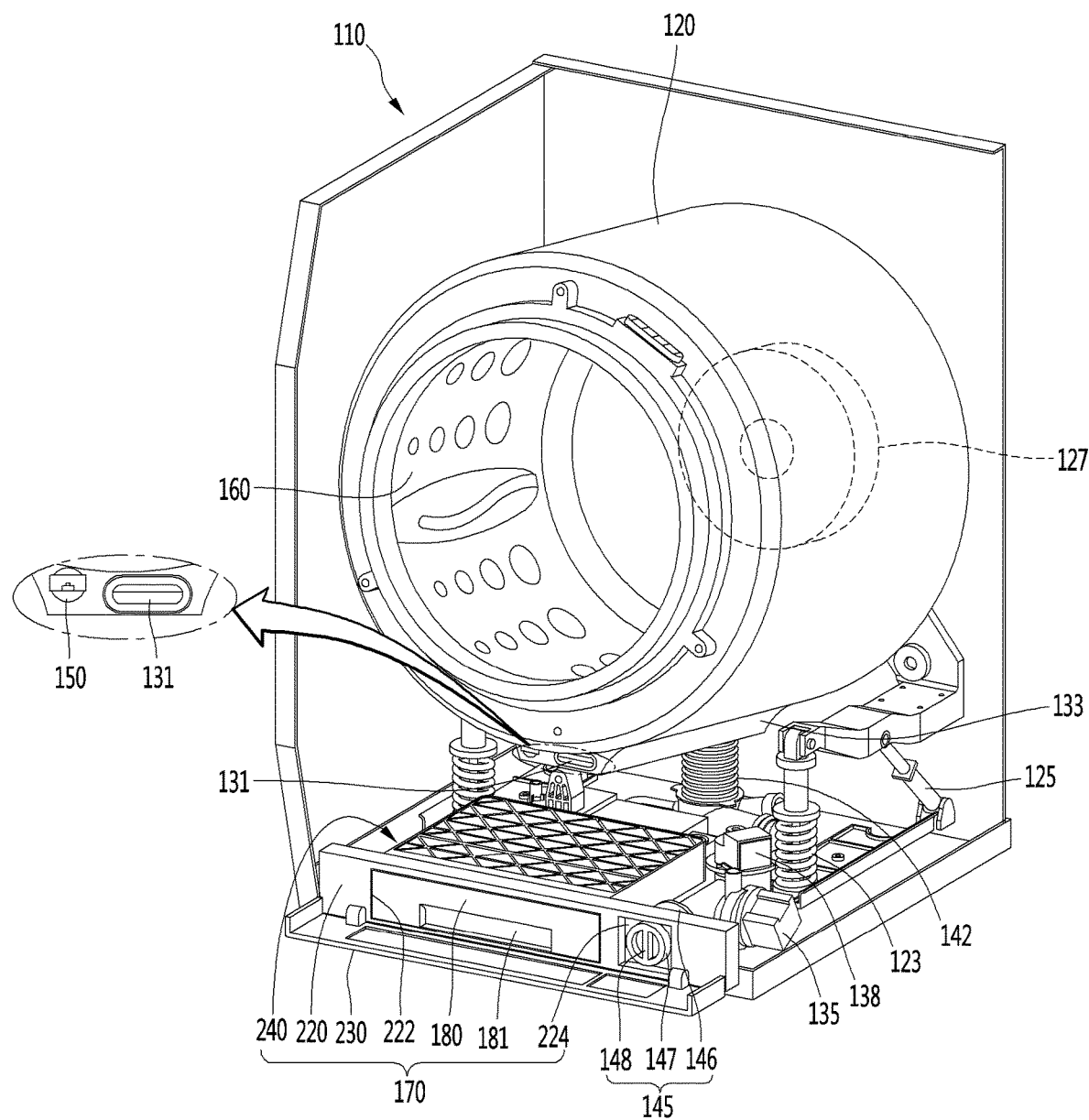
FIG. 2 is a perspective view illustrating an internal configuration of the washing machine.
Figure 3:
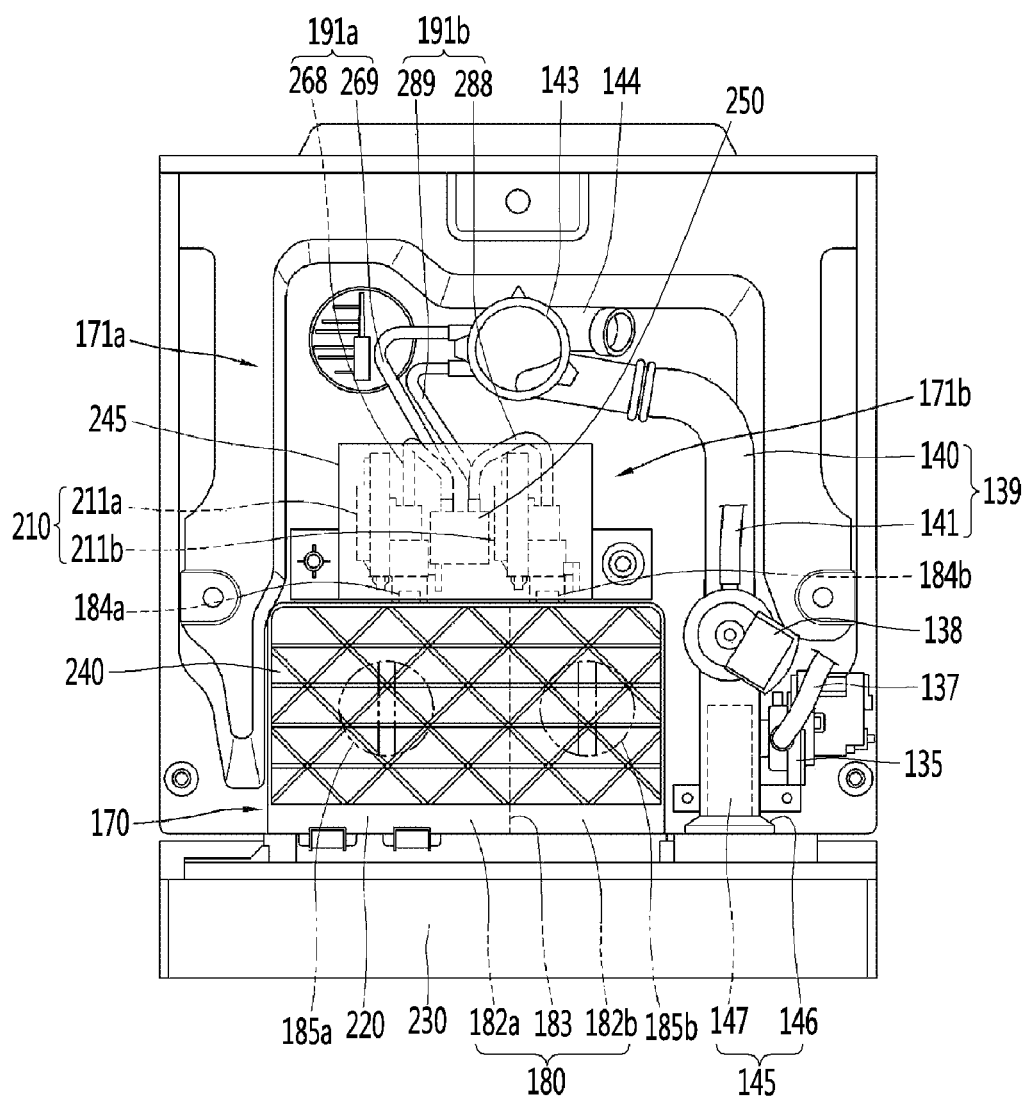
FIG. 3 is a plan view illustrating an internal bottom of the washing machine.
Figure 4:
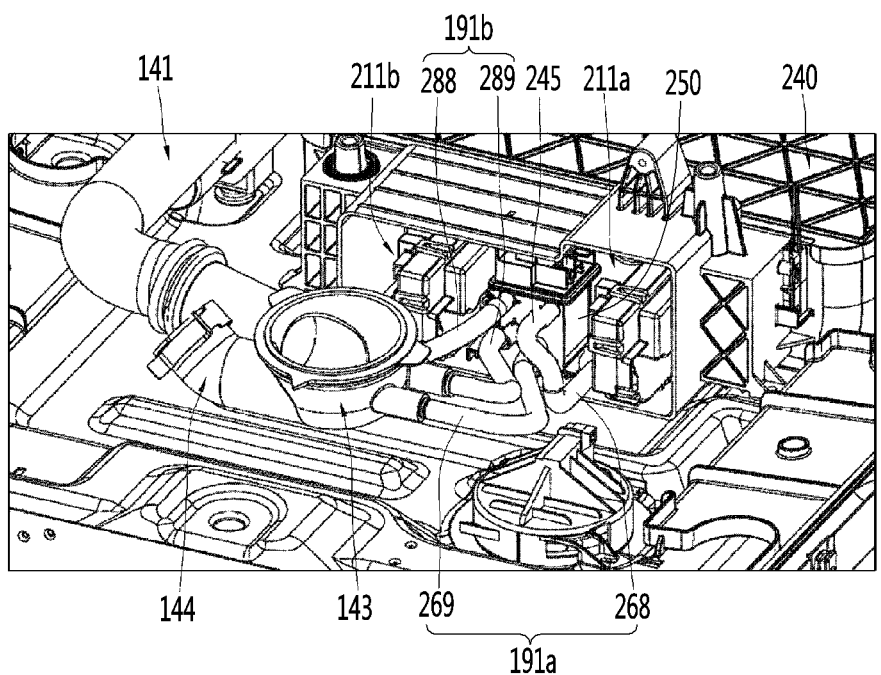
FIG. 4 is an enlarged perspective view illustrating the internal bottom of the washing machine, which is viewed from a rear side.

FIG. 1 is a perspective view illustrating an appearance of a washing machine to which a control method according to an embodiment of the present disclosure is applied. FIG. 2 is a perspective view illustrating an internal configuration of the washing machine. FIG. 3 is a plan view illustrating an internal bottom of the washing machine. FIG. 4 is an enlarged perspective view illustrating the internal bottom of the washing machine, which is viewed from a rear side.

Referring to FIGS. 1 to 4, the washing machine to which the control method according to the embodiment of the present disclosure is applied may include: a cabinet 110; a tub 120 provided in the cabinet 110; a drum 160 rotatably accommodated in the tub 120; a washing agent supply unit 170 including a storage container 180 accommodating a liquid washing agent including a liquid detergent or a liquid softener, the storage container 180 being extractable to the outside of the cabinet 110, a washing agent supply flow path 190 formed between the storage container 180 and the tub 120, and a pump 210 provided on the washing agent supply flow path 190 to supply the liquid washing agent to the tub 120; and a residual amount sensing unit 250 provided on the washing agent supply flow path 190 to sense a residual amount of the liquid washing agent.

In detail, the cabinet 110 may be formed in an approximately rectangular parallelepiped shape, and the tub 120 may be provided in the cabinet 110. The tub 120 may be formed in a cylindrical shape having an opened front surface. The tub 120 may be supported by a plurality of elastic members 123 and/or a plurality of dampers 125 such that vibration of the tub 120 can be suppressed.

A water collecting part 133 that stores washing water therein may be formed at a bottom portion of the tub 120. The water collecting part 133 forms a recessed part that protrudes to a lower side from a circumferential surface of the tub 120 formed in the cylindrical shape and extends in the length direction of the tub 120, to allow washing water to be collected therein. In addition, an electric heater 131 may be disposed in the water collecting part 133, heat the washing water collected in the water collecting part 133.

One or a plurality of turbidity sensors 150 may be mounted at one side of the water collecting part 133, to sense a pollution level of washing water.

The drum 160 may be accommodated in the tub 120.

Like the tub 120, the drum 160 may be formed in a cylindrical shape having an opened front surface. A driving motor 127 that rotates the drum 160 may be provided at a rear surface of the drum 160 or a rear surface of the tub 120. Openings of the tub 120 and the drum 160 may be disposed to face a front surface of the cabinet 110.

A door 115 that selectively opens/closes the openings formed at the front surfaces of the tub 120 and the drum 160 may be provided at the front surface of the cabinet 110. Laundry may be put into the drum 160 by opening the door 115.

A drainage pump 135 for draining water of the tub 120 and a circulating pump 138 for circulating washing water such that the washing water discharged from the tub 120 is again introduced into an upper region of the tub 120 may be provided at a lower side of the tub 120, i.e., the bottom of the cabinet 110.

A filter unit 145 that collecting foreign substances of water extracted from the tub 120. The filter unit 145 may include a filter casing 146, a filter 147 extractably inserted and coupled to the filter casing 146, and a handle provided at a front surface of the filter 147.

The filter casing 146 may be connected to a circulation pipe 140 that defines one region of a circulation flow path 139. The circulation flow path 139 may include the circulation pipe 140, a discharge pipe 141 connected to a discharge side of the circulating pump 138, a bellows 142, and a bellows connection part 143. The bellows connection part may be formed in, for example, a hemispherical shape having an opened upper side. A water level sensing pipe 144 that communicates with the tub 120 to sense a water level of the tub 120 may be connected to one side of the bellows connection part 143.

The discharge pipe 141 may be connected to the discharge side of the circulating pump 138, and one end portion of the discharge pipe 141 may be connected to an upper region of the tub 120. A drainage pipe 137 is connected to a discharge side of the drainage pump 135, to allow washing water passing through the filter unit 145 to be discharged to the outside of the washing machine.

Meanwhile, the washing agent supply unit 170 that supplies a washing agent to the tub 120 may be provided in the cabinet 110. In detail, the washing agent supply unit 170 may be provided, for example, at a lower side of the tub 120, i.e., the bottom of the cabinet 110.

The washing agent may include a liquid fabric detergent and a liquid fabric softener, and be defined as a material that can improve the washing effect of laundry.

The washing agent supply unit 170 may include the storage container 180, the washing agent supply flow path 190, and the pump 210.

The storage container 180 accommodates a liquid washing agent including a liquid detergent or a liquid softener, and is extractable to the outside of the cabinet 110. The washing agent supply flow path 190 may be formed between the storage container 180 and the tub 120. The pump 120 may be provided on the washing agent supply flow path 190.

The washing agent supply unit 17 may further include a frame 220 in which an extraction opening 222 for extracting the storage container 180 is formed, a cover 230 rotatably coupled to a front surface of the frame 220, and a storage container accommodating part 240 extending from a rear surface of the frame 220, the storage container accommodating part 240 accommodating the storage container 180 therein.

The frame 220 may be provided in a lower region of the front surface of the cabinet 110, and the cover 230 may be rotatably provided with respect to a horizontal axis passing through left and right edges of a lower end of the frame 220.

A filter opening 224 for access of the filter 147 may be formed at any point of the frame 220, which is spaced apart from the extraction opening 222 in a lateral direction. The cover 230 may simultaneously shield the extraction opening 222 and the filter opening 224 by being vertically rotated.

An internal space of the storage container 180 may be divided to separately accommodate a liquid fabric detergent and a liquid fabric softener. A handle 181 may be provided at a front surface of the storage container 180.

In detail, the storage container 180 may include a detergent accommodating part 182a that accommodates the liquid fabric detergent therein, a softener accommodating part 182b that accommodates the liquid fabric softener therein, and a dividing wall 183 that divides between the detergent accommodating part 182a and the softener accommodating part 182b.

The detergent accommodating part 182a and the softener accommodating part 182b may be configured to store different capacities according to kinds and amounts of detergent and softener used. In this embodiment, a case where the detergent accommodating part 182a is formed larger than the softener accommodating part 182b is illustrated, but sizes of the detergent accommodating part 182a and the softener accommodating part 182b may be appropriately adjusted.

A detergent injection hole may be formed at one side of an upper surface of the detergent accommodating part 182a. The detergent injection hole may be opened/closed by a detergent injection hole stopper 185a. A softener injection hole may be formed at the other side of the upper surface of the detergent accommodating part 182a. The softener injection hole may be opened/closed by a softener injection hole stopper 185b.

Meanwhile, the pump 210 that supplies a liquid washing agent may be disposed at the rear of the storage container accommodating part 240. The pump 210 may include a detergent pump 211a that supplies the liquid detergent and a softener pump 211b that supplies the liquid softener. The detergent pump 211a may be installed to communicate with the detergent accommodating part 182a, and the softener pump 211b may be installed to communicate with the softener accommodating part 182b.

A detergent pump connection part 184a and a softener pump connection part 184b, which are connected to the detergent pump 211a and the softener pump 211b to communicate with the detergent pump 211a and the softener pump 211b, may be provided in rear regions of the storage container 180, respectively.

Here, when the storage container 180 is received, the detergent pump connection part 184a and the softener pump connection part 184b may be configured such that the detergent accommodating part 182a and the softener accommodating part 182b are connected to the detergent pump 211a and the softener pump 211b to communicate with the detergent pump 211a and the softener pump 211b, respectively. When the storage container 180 is extracted, the detergent pump connection part 184a and the softener pump connection part 184b may be configured to block detergent from the detergent accommodating part 182a and leakage of softener from the softener accommodating part 182b, respectively.

An installation space part 245 of the detergent pump 211a and the softener pump 211b may be provided at one side (the rear on the drawing) of the storage container accommodating part 240. The installation space part 245 may be formed in a rectangular parallelepiped shape that is opened to the rear. The installation space part 245 may be configured such that the detergent pump 211a and the softener pump 211b are simultaneously accommodated therein.

Meanwhile, the washing agent supply flow path 190 for supplying the liquid washing agent to the tub 120 may be provided in a rear region of storage container accommodating part 240.

The washing agent supply flow path 190 may include a detergent supply flow path 191a for supplying the detergent and a softener supply flow path 191b for supplying the softener. The residual amount sensing unit 250 that senses a residual amount of the liquid washing agent may be provided on the washing agent supply flow path 190. As described above, the residual amount sensing unit 250 is installed separately from the storage container 180, so that the storage container 180 can be easily moved. In addition, the residual amount sensing unit 250 may be disposed between the detergent pump 211a and the softener pump 211b.

Figure 5:
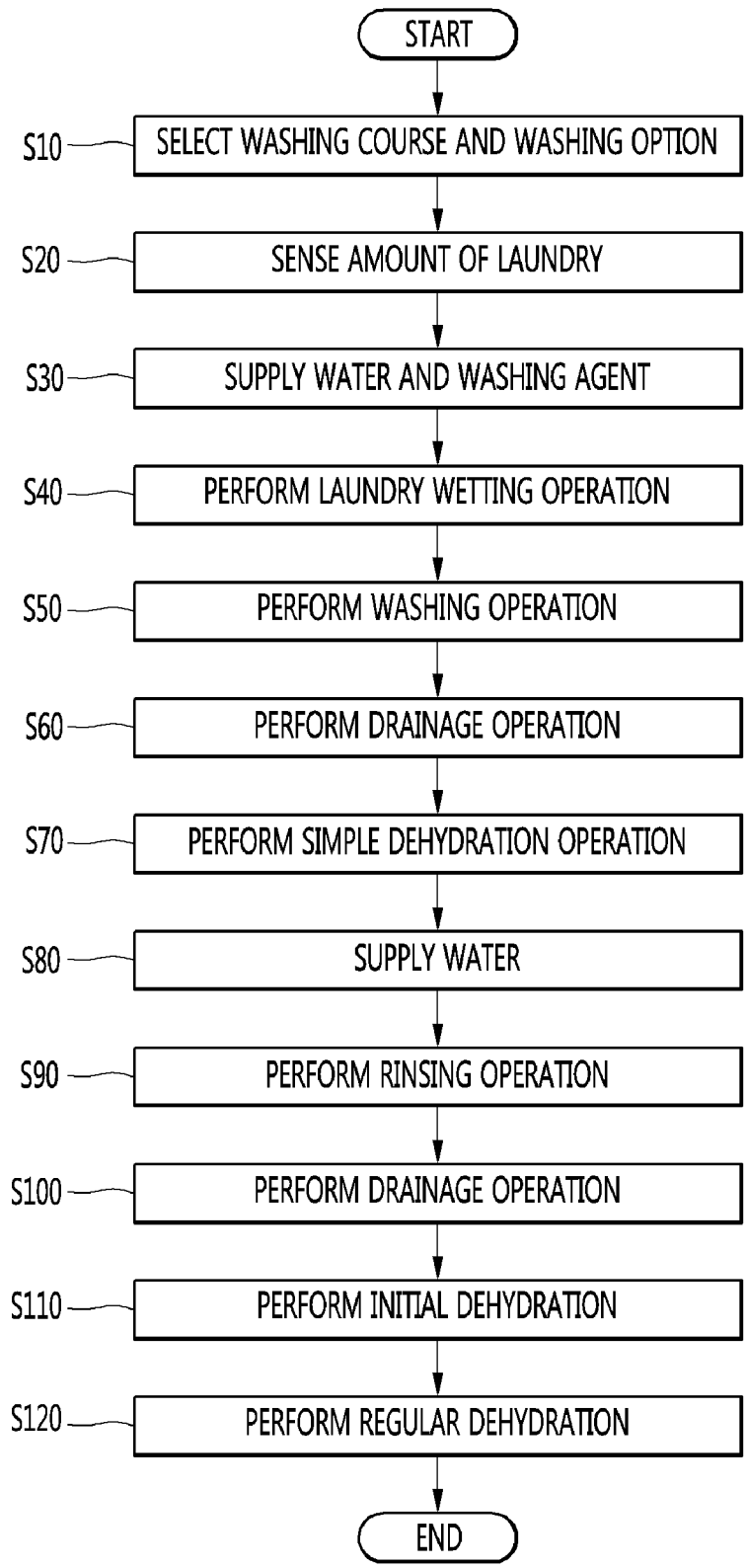
FIG. 5 is a flowchart illustrating the whole process of the washing machine according to the embodiment of the present disclosure.

FIG. 5 is a flowchart illustrating the whole process of the washing machine according to the embodiment of the present disclosure.

Referring to FIG. 5, if a washing course and a washing option are selected by a user (S10), an amount of laundry is sensed through rotation of the driving motor 127 (S20). In addition, an amount of washing agent, an amount of washing water, a number of times of rinsing, and a washing time, which correspond to the sensed amount of laundry, are determined. In addition, the determined amount of washing water and the determined amount of washing agent are supplied (S30). If the supply of washing water is completed, a laundry wetting operation is performed during a set time (S40). In addition, if the laundry wetting process is completed, a regular washing operation is performed as the driving motor 128 is rotated clockwise/counterclockwise (S50).

Meanwhile, if the washing operation is completed, the washing water is drained (S60), a simple dehydration operation is performed such that the washing agent and the washing water are separated from laundry (S70). If the simple dehydration operation is ended, the supply of water for rinsing is performed (S80). In addition, the water supply is completed, a rinsing operation is performed (S90).

Meanwhile, if the rinsing operation is completed, a drainage operation is performed (S100). After that, initial dehydration (S110) and regular dehydration (S120) are performed.

In addition, washing water heating is performed between the laundry wetting operation (S40) and the washing operation (S50).

Figure 6:
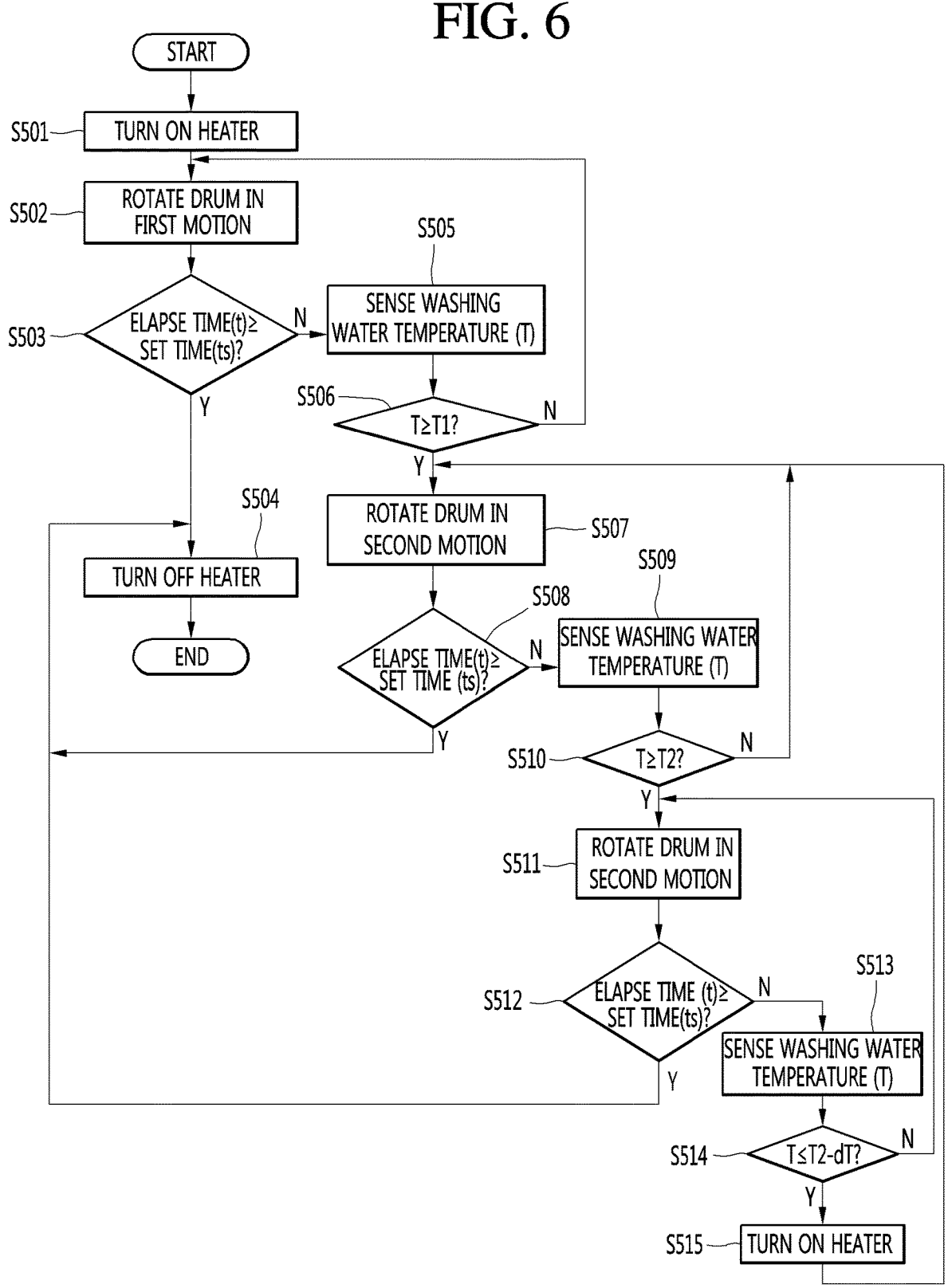
FIG. 6 is a flowchart illustrating the control method of the washing machine according to the embodiment of the present disclosure.

FIG. 6 is a flowchart illustrating the control method of the washing machine according to the embodiment of the present disclosure.

Referring to FIG. 6, if the washing operation (S50) is started after the laundry wetting operation (S40) is completed, a washing heater is turned on (S501). As the washing heater is turned on, the driving motor 127 is operated, so that the drum 160 is rotated in a first motion (S502). The first motion may be a swing motion in which the drum repeats a clockwise rotation and a counterclockwise rotation at a first set rotation speed. In this case, the drum is rotated by about 90 degrees and then stopped, so that laundry falls to the bottom of the drum. The set rotation speed may be 40 rpm.

In detail, in the swing motion, the drum repeats clockwise and counterclockwise rotations. In this case, the drum is rotated until laundry is moved up by about 90 degrees in the clockwise direction from the lowermost point of the drum and then stopped to allow the laundry to fall to the lowermost point. In this state, the drum is rotated until the laundry is moved up by about 90 degrees in the counterclockwise direction from the lowermost point and then stopped to allow the laundry to fall to the lowermost point of the drum. Therefore, the swing motion may be defined as a motion in which the drum is rotated less than once (about ¼ time) in each of the clockwise direction and the counterclockwise direction.

At the same time when the washing operation is started, an elapse time t is accumulated, and it is determined in real time whether the elapse time t has reached a set time ts (S503). The set time ts means a heating washing time for which the washing operation is performed using heated washing water in a total time taken until the washing operation is completed.

If it is determined that the elapse time t has reached the set time ts, the washing heater is turned off (S504), so that a heating washing process is ended. In addition, a non-heating washing process is performed in which the washing heater is not operated during except the heating washing process in the time required to perform the whole washing operation. Therefore, that the heating washing process is ended after the washing heater is turned off does not means that the washing operation is completed, but means that the heating washing process is ended.

If it is determined that the elapse time t has not reached the set time ts, a washing water temperature T is sensed (S505), and it is determined whether the sensed washing water temperature T has reached a first set temperature T1 (S506). The first set temperature T1 may be a temperature in a range of 40 to 45 degrees Celsius, at which the vitality of enzymes contained in the washing agent can be increased.

In detail, the drum is continuously rotated in the first motion until the washing water temperature T reaches the first set temperature T1. In addition, if it is determined that the washing water temperature T has reached the first set temperature T1, the drum is rotated in a second motion (S507).

The second motion may be a rolling motion in which the driving motor 127 is rotated in one direction at a second set rotation speed or a tumble motion in which the driving motor 127 is rotated in one direction at a third set rotation speed different from that in the second motion. The second set rotation speed may be 35 to 45 rpm, and the third set rotation speed may be 46 to 50 rpm. That is, the second motion may be defined as a motion in which the drum is rotated once or more at a set speed.

As described above, in the present disclosure, the rotation of the drum is weakened until the washing water temperature reaches the first set temperature to rapidly increase the temperature of water around the washing heater. After the washing water temperature reaches the first set temperature, the rotation of the drum is strengthened to increase the falling power of laundry and circulate washing water.

Meanwhile, it is continuously determined whether the entire elapse time t has reached the set time ts (S508). In addition, if it is determined that the elapse time t has reached the set time ts, the heater is turned off, and the non-heating washing process is performed. On the contrary, if it is determined that the elapse time t has not reached the set time ts, a washing water temperature is periodically sensed (S509), and it is determined whether the sensed temperature has reached a second set temperature T2 (S510).

In detail, if it is determined that the washing water temperature has not reached the second set temperature T2, the drum is continuously rotated in the second motion. On the contrary, if it is determined that the washing water temperature has reached the second set temperature T2, the heater is turned off (S511). In addition, it is continuously determined whether the elapse time t has reached the set time ts (S512). If it is determined that the elapse time t has not reached the set time ts, the washing water temperature is periodically sensed (S513). That is, it is determined whether the washing water temperature has been decreased to a third set temperature T3 after the heater is turned off.

In detail, it is determined whether the washing water temperature T has been decreased to the third set temperature T3 that is decreased by dT from the second set temperature T2 (S514). If the washing water temperature T has been decreased to the third set temperature T3, the washing heater is again turned on. The temperature variation dT may be 3 to 5 degrees Celsius.

In addition, on/off operations of the heater are repeatedly performed such that the washing water temperature T is maintained between the second set temperature T2 and the third set temperature T3 until the elapse time t reaches the set time ts. In addition, if the set time ts elapses, the washing heater is completely turned off, and the non-heating washing process is then performed during a residual washing time.

Figure 7:
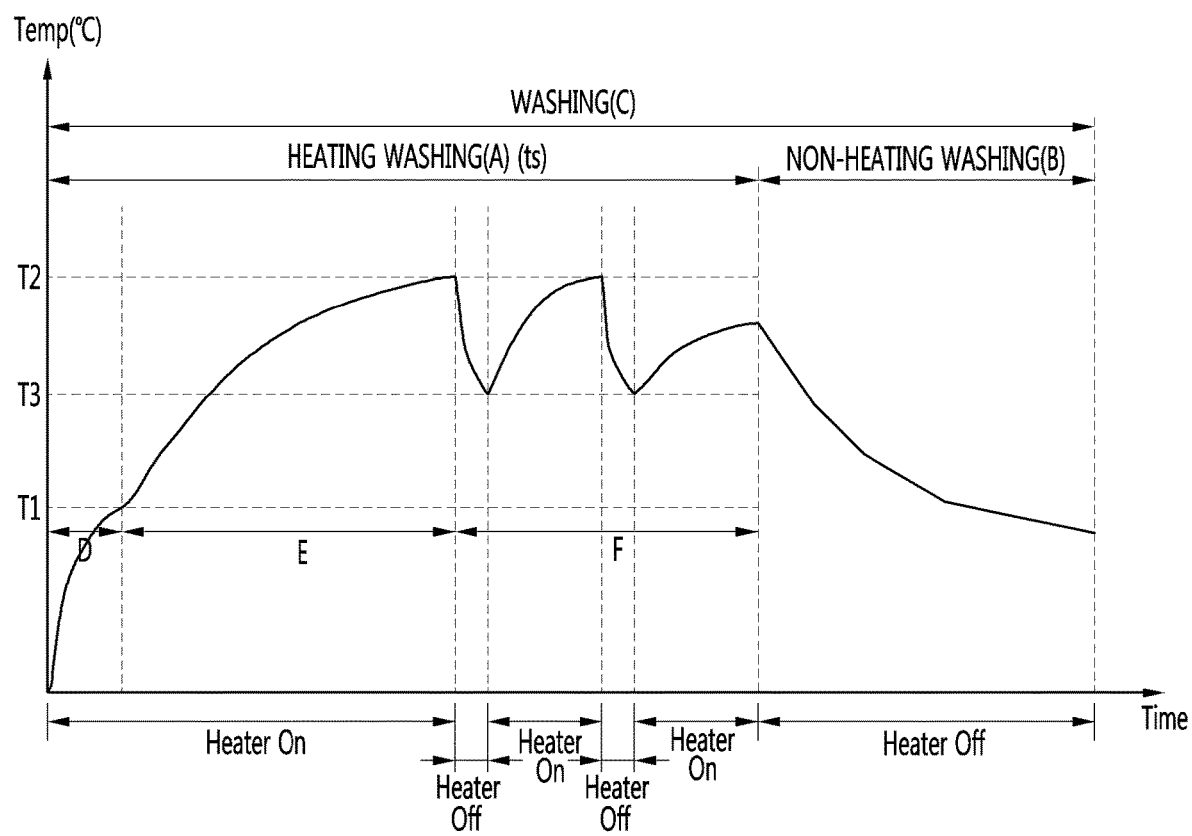
FIG. 7 is a graph illustrating change in washing water temperature for each washing time while the control method is being performed according to the embodiment of the present disclosure

FIG. 7 is a graph illustrating change in washing water temperature for each washing time while the control method is being performed according to the embodiment of the present disclosure.

Referring to FIG. 7, if the washing operation is started and the heater is turned on, the drum is rotated in the first motion (swing motion) until the washing water temperature is increased to the first set temperature T1, so that the increase rate of the washing water temperature with respect to time is relatively large. After the washing water temperature reaches the first set time T1, the drum is rotated in the second motion (rolling motion or tumble motion), so that the increase ratio of the washing water temperature with respect to time is relatively small.

In addition, in the whole washing operation (C), the heating washing process A is performed for the set time ts, and the non-heating washing process B is performed during the residual time. In addition, the heating washing process A may be divided into a first section D in which the drum is driven in the first motion, a second section E in which the drum is driven in the second motion, and a third section F in which the on/off operations of the washing heater are repeated such that the washing water temperature is maintained as a value between the second set temperature T2 and the third set temperature T3, and the drum is driven in the second motion.

As described above, the drum is rotated in the first motion until the washing water temperature reaches the first set temperature T1, to rapidly increase the washing water to the first set temperature T1. After the washing water temperature reaches the first set temperature T1, the drum is rotated in the second motion stronger than the first motion, to relatively gradually increase the washing water up to the second set temperature T2. Thus, it is possible to provide a time for which enzymes of the washing agent can sufficiently react. Simultaneously, it is possible to prevent protein pollutants stained on laundry from being coagulated.

Further, the drum is rotated in a specific motion in a process of heating washing water, so that the washing operation is formed even in a process of heating laundry, thereby improving washing efficiency.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A control method of a washing machine including: selecting a washing course and a washing option, and sensing an amount of laundry; supplying washing water and a washing agent, corresponding to the sensed amount of laundry; performing a laundry wetting operation for a set time; and performing a washing operation after the laundry wetting operation is completed, wherein the washing operation includes a heating washing process, wherein the heating washing process includes a heater-on section which is a section that a washing heater is maintained in a turned-on state from a starting point of the washing operation, and wherein the heater-on section is divided into a first section and a second section based on a temperature of the washing water, wherein the control methods comprises:

when the washing operation is started, operating the washing heater;

operating the drum in a first motion in the first section of the heater-on section;

determining the temperature of the washing water while the drum is operating the drum in the first motion, wherein the operating of the drum in the first motion is maintained until the washing water temperature is determined to reach a first temperature (T1) in the first section of the heater-on section;

when the washing water temperature is determined to reach the first set temperature (T1), operating the drum in a second motion; and determining the temperature of the washing water while the drum is operating the drum in the second motion, wherein the operating of the drum in the second motion is maintained until the washing water temperature is determined to reach a second set temperature (T2) in the second section, wherein a total number of rotations of the drum in the second motion is greater than a total number of rotations of the drum in the first motion, to rapidly increase the washing water temperature in the first section and to gradually increase the washing water temperature in the second section.

2. The control method of claim 1, wherein the first motion is a motion in which the drum is rotated clockwise/counterclockwise at a first set rotation speed.

3. The control method of claim 2, wherein the second motion is any one of a rolling motion in which the drum is rotated in one direction at a second set rotation speed or a tumble motion in which the drum is rotated in one direction at a third set rotation speed greater than the second set rotation speed.

4. The control method of claim 3, wherein the heating washing process further includes a heater on-off section, wherein, when the washing water temperature is determined to reach a second set temperature (T2) higher than the first set temperature (T1), the washing heater is turned off and the heater on-off section is started, and wherein, in the heater on-off section, an operation in which the washing heater is turned on when the washing water temperature is decreased to a third set temperature by a temperature variation (T3: T3=T2−dT), and the washing heater is turned off when the washing water temperature is increased to the second set temperature (T2) is repeatedly performed.

5. The control method of claim 4, wherein the operation in which the washing heater is repeatedly turned on and turned off is performed until an elapse time (t) reaches a set time (ts) after the washing operation is started.

6. The control method of claim 4, wherein the drum is operated in the second motion while the washing heater is being repeatedly turned on and turned off.

7. The control method of claim 4, wherein, after the washing water temperature first reaches the second set temperature (T2), the drum is operated in the second motion only in a state in which the washing heater is turned on.

8. The control method of claim 4, wherein the washing operation further includes a non-heating washing process which is performed after completion of the heating washing process and in which the washing heater is maintained in an off-state, and wherein, when an elapse time (t) reaches the set time (ts), the non-heating washing process is performed during a residual time obtained by subtracting the set time (ts) from a time required to perform the whole washing operation.

9. The control method of claim 1, wherein the first set temperature (T1) is 40 to 45 degrees Celsius.

10. The control method of claim 4, wherein the temperature variation (dT) is 3 to 5 degrees Celsius.

11. A control method of a washing machine, comprising: selecting a washing course and a washing option;
sensing an amount of laundry;
supplying washing water and a washing agent, corresponding to the sensed amount of laundry;

performing a laundry wetting operation for a set time; and
performing a washing operation after completing the performing of the laundry wetting operation,
wherein the washing operation includes:
  a heating washing process; and
  a non-heating washing process after completion of the heating washing process,
wherein the heating washing process includes:
  a heater-on section that a washing heater is maintained in an turn-on state; and
  a heater-on-off section that the washing heater is alternately on and off according to a washing water temperature,
  wherein, when the washing operation is started, a drum is operated in a predetermined motion, and
  wherein the motion of the drum operation is differently determined according to the washing water temperature within the heater-on section.

* * * * *